May 27, 1952 G. J. PITRE 2,598,011
SHRIMP AND MINNOW ADAPTER FISH LURE
Filed Nov. 7, 1949 3 Sheets-Sheet 1
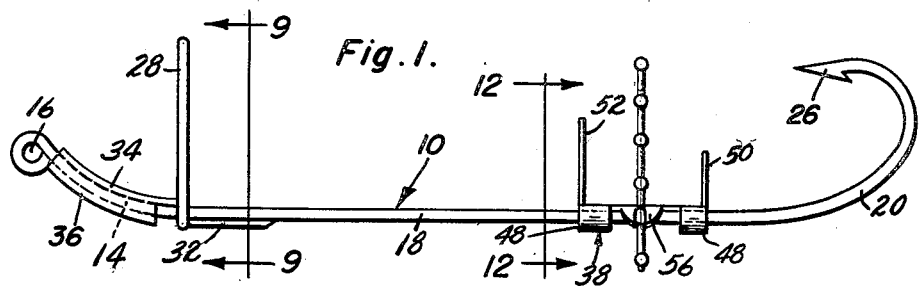
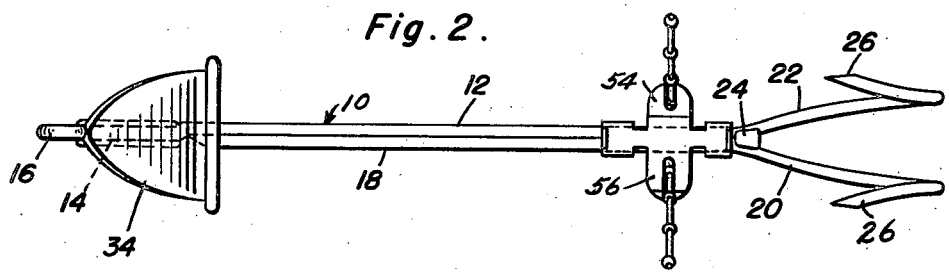
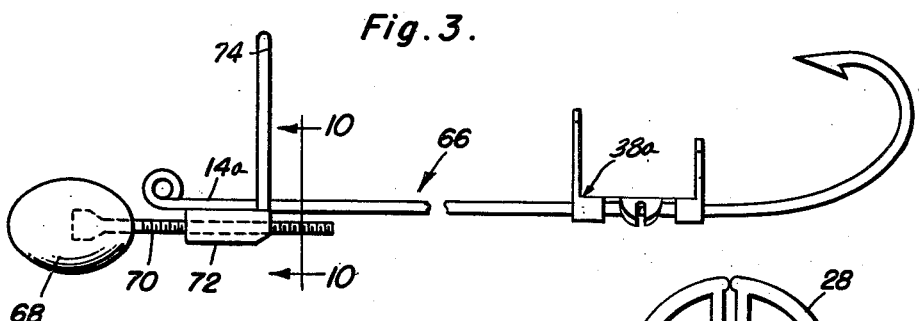
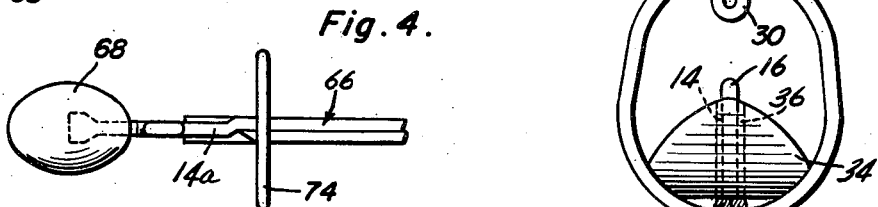
Guillius J. Pitre
INVENTOR.
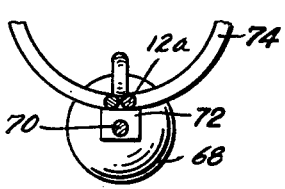

May 27, 1952 G. J. PITRE 2,598,011
SHRIMP AND MINNOW ADAPTER FISH LURE
Filed Nov. 7, 1949 3 Sheets-Sheet 2

Guillius J. Pitre
INVENTOR.

BY

May 27, 1952 — G. J. PITRE — 2,598,011
SHRIMP AND MINNOW ADAPTER FISH LURE
Filed Nov. 7, 1949

Guillius J. Pitre
INVENTOR.

Patented May 27, 1952

2,598,011

UNITED STATES PATENT OFFICE 2,598,011

SHRIMP AND MINNOW ADAPTER FISH LURE

Guillius J. Pitre, New Orleans, La.

Application November 7, 1949, Serial No. 125,969

11 Claims. (Cl. 43—44.8)

This invention appertains to a fishing lure, and has for its primary object to securely hold live bait in a natural life-like position in the water, the bait being unable to detach itself from the holder in the water and serving as an attracter for fish.

Another important object of this invention is to provide a live bait holder having adjustable bait-securing means, which will securely retain the bait on the holder, the bait being held in a natural manner to produce a realistic appearance, as the holder is drawn through the water.

Another important object of this invention is to provide a live bait holder having means for retaining a minnow or shrimp or similar lure in such a manner as to prevent loss of the lure or deformation thereof and also having hook elements formed thereon in such a manner as to engage a fish striking on the lure or bait.

These and ancillary objects and meritorious structural features are attained by this invention, the preferred embodiments of which are set forth in the following description and illustrated in the accompanying drawings, wherein:

Figure 1 is a side elevational view of a lure or bait holder, constructed in accordance with the principles of this invention, and designed for use in bottom fishing;

Figure 2 is a top plan view of the bottom fishing lure;

Figure 3 is a side elevational view of another embodiment of this invention, the lure being designed for still fishing;

Figure 4 is a fragmentary plan view of the lure illustrated in Figure 3;

Figure 9 is a transverse sectional view taken on line 9—9 of Figure 1;

Figure 10 is a fragmentary transverse sectional view taken on line 10—10 of Figure 3;

Figure 5:
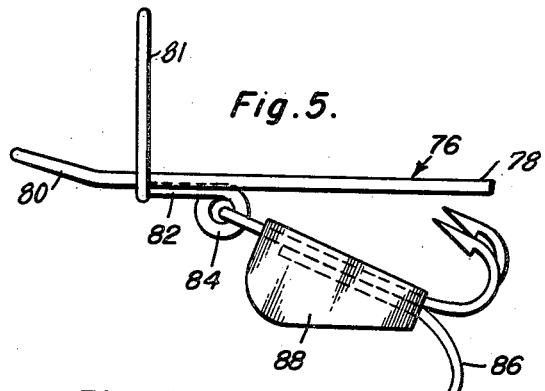
Figure 5 is an elevational view of the front portion of another embodiment of this invention, the lure being designed for trolling.

In the accompanying drawings, attention is directed to Figures 1, 2, 7, 9 and 12 the bait-retaining fishing lure 10 being adapted for use when using live shrimp as bait and when fishing on the bottom of a lake or stream or for casting and moving the lure along the bottom of the stream. The lure includes an elongated substantially rigid thin rod 12 having an offset, upwardly curved end 14 terminating in a line-receiving eyelet 16. A rod 18 is secured in side-by-side relationship to the rod 12, one end of the rod 18 terminating at the offset end 14 on the rod. The rods 18 and 12 are formed with outwardly diverging ends 20 and 22, being soldered together as at 24, and extending upwardly and inwardly to terminate in integral barbed ends 26. It is to be noted that the barbed ends 26 are bent outwardly beyond the curved ends 20 and 22 and are disposed in a plane substantially parallel to the rods 18 and 12. The offset end 14 of the rod 12 constitutes the head end and a fixed bait-encircling member 28 is secured thereto. The member 28 is formed from a rod, which is bent to define a ring having an integral depending lip 30. One end 32 of the rod forming member 28 extends rearwardly from the ring formation and is positioned beneath the rods 12 and 18 and soldered or otherwise secured thereto. A concavo-convex plate 34 is secured at its base end to the ring and is formed with a sleeve 36 disposed on the offset end 14 of the rod 12. The plate 34 constitutes a weight or sinker and forms an upturned lip on the head end.

Figure 7:
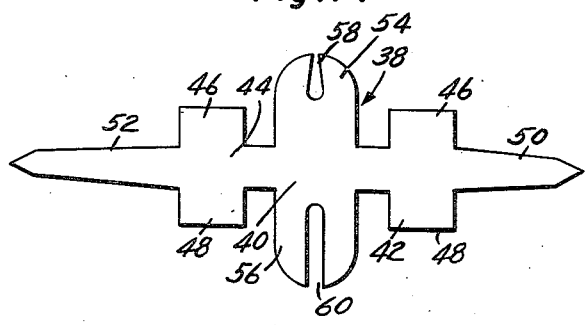
Figure 7 is a plan view of the blank of the bait holding member shown applied to the lures of Figures 1, 2 and 3.
Figure 12:
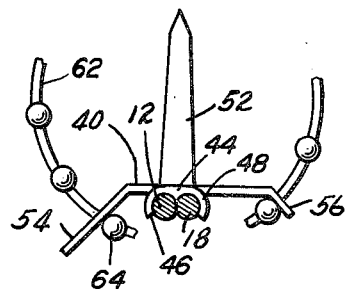
Figure 12 is a transverse sectional view taken on line 12—12 of Figure 1 and showing part of the bait encircling and holding member secured thereto.

Attention is directed to Figure 7, wherein the adjustable bait-retaining member 38 is illustrated. The same includes a plate 40 having axially aligned end sections 42 and 44. Wings 46 and 48 project laterally from the end sections and are adapted to be bent on the rods 12 and 18, as seen in Figure 12, so as to slidably mount the plate on the rods. Impaling pins 50 and 52 extend rearwardly from the end sections 42 and 44 and are adapted to be bent upwardly to a vertical position, the impaling pins being perpendicular to the rods 12 and 18 and to the plate 40 slidably mounted thereon.

Arms 54 and 56 are integrally formed on the longitudinal marginal edges of the plate and project laterally therefrom. The outer ends of the arms are formed with axial slots 58 and 60 and the outer ends of the arms are bent outwardly and downwardly, as seen in Figure 12. It is to be noted that the arm 54 is substantially longer than the arm 56 and is formed with a longer offset outer end. Bait-encircling and securing means is provided and adapted to be fastened to the anchoring means or slotted arms on the body plate, the means including an elongated resilient or rubber band 62 having stops or beads 64 secured thereon at spaced intervals. As seen in Figure 12, the ends of the bands are received in the slots, with the stops 64 anchoring the ends to the arms.

In use, in baiting the holder, the head of the shrimp is inserted through and held in the fixed retaining member or ring 28 without causing injury to the head, the plate 40 being adjusted on the rods 12 and 18 to a position under the main portion of the bait. The body is then impaled on the upstanding pins 50 and 52 and the band 62 is positioned about the bait to embrace the same and is secured to the arms by the stops 64. The tail portion of the shrimp will lie between the outwardly diverging ends or branches 20 and 22 and, as the lure is moved along the bottom of a stream, a fish striking on the rear of the lure will be impaled on the barbs 26. It is to be noted that the double extending hook arrangement at the tail and the upwardly curved lip or nose portion, defined by the lip plate 34, will prevent any possibility of the lure snagging in weeds or the like on the bottom of the stream.

Referring now more particularly to the modified form, illustrated in Figures 3, 4 and 10 it is to be noted that this form of lure is primarily designed and adapted for use in still fishing, the lure being dropped or thrown into the water and allowed to assume a relatively still position therein. The lure, generally designated by the reference numeral 66, is constructed similar to the lure 10 and is formed with a tail structure 28a, similar to the tail structure 28, and employs a bait-retaining means 38a similar to bait retaining means 38. The front end 14a of the rod is, however, in axial alignment with the rod 12a and an extending and adjustable counterbalance and sinker element 68 is provided. An adjusting screw 70 is embedded in the sinker and projects rearwardly therefrom, the screw being threadedly disposed in an internally threaded sleeve 72 secured beneath the body of the lure and disposed in alignment therewith. A fixed ring 74 is formed perpendicular to the body and has its lower end secured on the sleeve or block 72.

Figure 6:
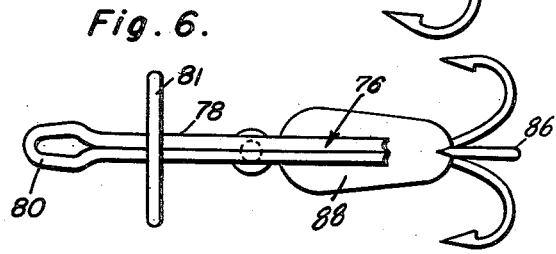
Figure 6 is a top plan view of the lure illustrated in Figure 5.
Figure 11:
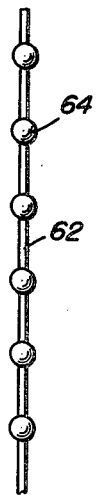
Figure 11 is a fragmentary plan view of the resilient bait encircling and holding member.

The embodiment illustrated in Figures 5 and 6 is especially designed for trolling. The trolling lure 76 includes a body portion formed from a single rod 78 bent upon itself to form an extending line-receiving eyelet 80, with the ends of the rod disposed in side-by-side relationship to form the body portion. The fixed ring 81 is constructed similar to the ring 28 and includes an extending end 82 secured beneath the body and terminating in an eyelet 84 on which a gang hook 86 is swivelly secured. A plate 88 is bent around the shank of the gang hook and functions as a weight therefor.

Figure 13:
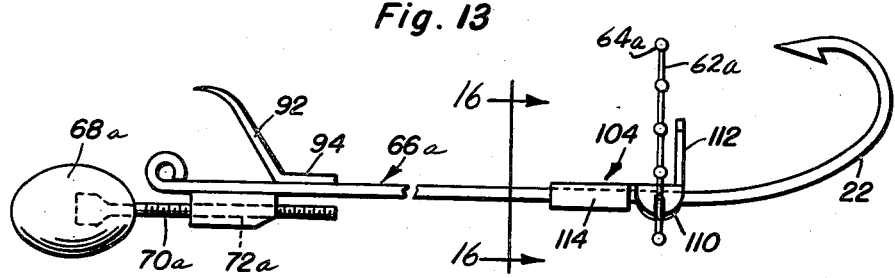
Figure 13 is a side elevational view of another embodiment of this invention, the lure being mounted for still fishing.
Figure 14:
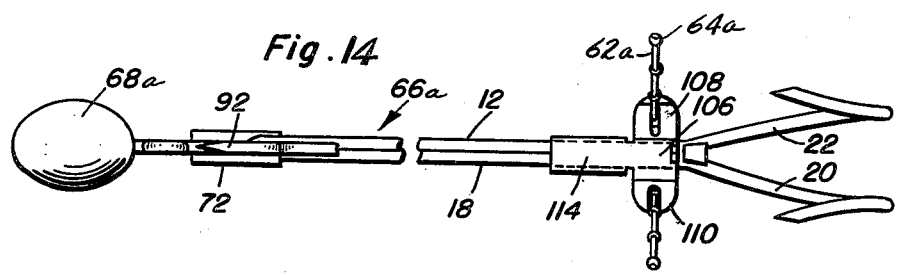
Figure 14 is a plan view of the lure illustrated in Figure 13.
Figure 15:
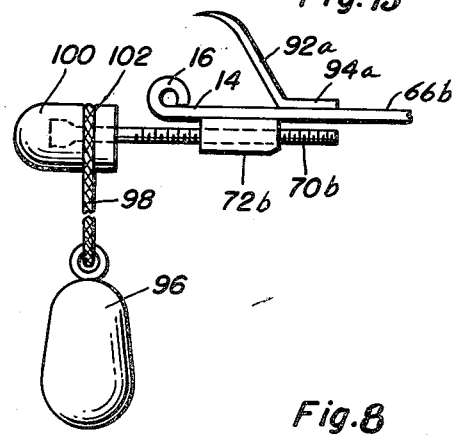
Figure 15 is a fragmentary elevational view of another embodiment of the lure illustrated in Figure 13.
Figure 16:
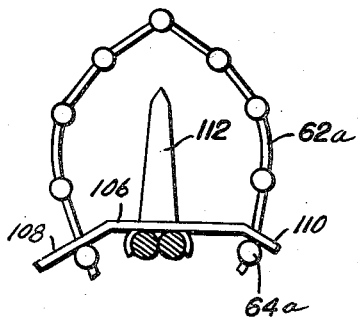
Figure 16 is a transverse sectional view taken on line 16—16 of Figure 13 and showing part of the bait encircling and holding member secured thereto.

Another embodiment is illustrated in Figures 13, 14 and 16. This embodiment is designed for still fishing with minnows or small fish as bait and is constructed similar to that illustrated in Figures 3 and 4 and includes a wire body 66a supporting at its front end a sleeve 72a in which the threaded shank 70a of a weight 68a is receivably engaged. However, the fixed retaining ring 28 is dispensed with and a forwardly and upwardly directed fixed impaling pin 92 is provided, the same being formed with a base 94 secured on the body portion 66a. As seen in Figure 15 another type of lure is provided involving a counterbalancing weight 96 is suspended by means of flexible element 98 from the adjustable sinker element 100, constructed similar to the sinker 68a. An annular groove 102 is formed in the sinker 100 to receive the flexible element whereby the counterbalancing weight 96 is suspended from the sinker.

The sinker 100 is provided with a threaded shank 70b that receivably engages a threaded sleeve 72b fixed to the forward end of the body portion 66b. The base 94a of an upwardly and forwardly inclined pin 92a is fixed to the body portion 66b over sleeve 72b.

Figure 8:
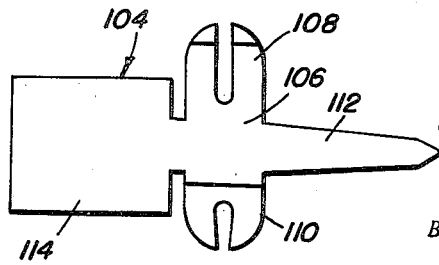
Figure 8 is a plan view of the blank of the bait holding member shown in use with the lure of Figures 13 and 14.

As seen in Figure 8, a modified form of adjustable bait-retaining means 104 is illustrated and may be employed in conjunction with the body portions of any of the lures disclosed. The same includes a mounting plate 106 adjustably and slidably mounted on the body portion of the lure and from which laterally project slotted arms 108 and 110. An impaling pin 112 projects rearwardly from the body plate 106 and is adapted to be bent upwardly at right angles thereto. At the outer end of the plate 106 is an integrally formed enlarged section 114 which is adapted to have its opposing sides bent downwardly and inwardly around the body of the lure to define a guide sleeve for the plate 106. Thus, as seen in Figure 13, a fixed impaling pin 92 is provided and a single adjustable impaling pin 112 is provided, complementary to the fixed pin. Of course, as seen in Figure 16, the resilient band 62a similar to band 62 is provided and is secured to the arms 108 and 110 by the stop 64a.

Thus, it can be seen that there is provided a live bait holder, which is adapted to securely retain a live fish or minnow in a natural position. The various modified forms provided are, of course, equipped with different arrangements of hooks and body portions for specific fishing purposes. However, except for the various forms provided for various types of fishing, such as trolling, still fishing, bottom fishing, and the like, all of the forms comprise the novel features of the adjustable bait retaining means in association with the resilient band stop members and the novel formation of the body portions of the lures.

Having described the invention, what is claimed as new is:

1. A live bait holder comprising a rod having a line-receiving eyelet formed at one end, offset integral branches formed at the opposite end, said branches extending upwardly and inwardly and terminating in barbs, a plate slidably mounted on said rod, an impaling pin extending upwardly from the plate, said plate having arms extending laterally therefrom in substantially opposite directions adjacent the pin with the ends of the arms provided with longitudinal slots, a resilient band, stops on said band, said band encircling a bait disposed between the branches and resting on the body with the stops anchored in the slots in the arms, said band coacting with said pin in retaining the bait on said plate.

2. A live bait holder comprising a rod having a line-receiving eyelet formed at one end, offset integral branches formed at the opposite end, said branches extending upwardly and inwardly and terminating in barbs, a plate slidably mounted on said rod, impaling pins extending upwardly from the plate, said plate having arms extending laterally therefrom in substantially opposite directions adjacent the pins with the ends of the arms provided with longitudinal slots, a resilient band, stops on said band, said band encircling a bait disposed between the branches and resting on the body with the stops anchored in the slots in the arms, and a fixed ring extending vertically from the body to encircle the bait.

3. The combination of claim 1, wherein said plate is formed as a split sleeve detachably and slidably clamped on the rod.

4. A live bait holder comprising a rod having a line receiving eyelet formed at one end, offset integral branches formed at the other end, said branches extending upwardly and inwardly and terminating in barbs, a plate slidably mounted on the body, means for retaining the bait on said plate, and a sinker member threadedly and adjustably secured to the body beneath the eyelet.

5. A live bait holder comprising a body, a member slidably mounted on the body, means for securing a live bait on said member, an internally threaded sleeve formed on the underside of the body in axial alignment therewith, and a sinker member having a threaded fastener adjustably received in said sleeve.

6. A live bait holder comprising an elongated body having a pair of hooks at one end that are spaced apart and disposed in side by side relation, whereby a bait may be placed between said hooks, a member slidably mounted on said body, an impaling pin extending upwardly from said member, a slotted arm projecting laterally from each side of said member, and retaining means releasably and adjustably secured to said arms and yieldingly retaining a bait on said member and said pin.

7. A live bait holder comprising an elongated body having a pair of hooks at one end that are spaced apart and disposed in side by side relation, whereby a bait may be placed between said hooks, a member slidably mounted on said body, an impaling pin extending upwardly from said member, a slotted arm projecting laterally from each side of said member, a single length resilient wire securing member adapted to embrace a bait impaled by said pin and to yieldingly retain a bait on said slidable member and said pin, and stop members on said wire securing member at spaced points, the end portions of said securing member being received in the slots of said arms and two of said stop members engaging the undersurface of said arms.

8. The combination of claim 6 and means fixed to the end of said body remote from said hooks coacting with said pin and said retaining means adapted to engage and retain a bait on said body.

9. The combination of claim 5 and a rigid bait-encircling member fixed to and rising from the body and coacting with said securing means in holding a bait on said body.

10. The combination of claim 5 and an upwardly and forwardly directed fixed impaling pin secured to the forward end of said body and coacting with said securing means in holding a bait on the body.

11. The combination of claim 5 wherein said sinker member is provided with an annular groove, a flexible element received in the groove, and a weight attached to said element and suspended from the sinker member.

GUILLIUS J. PITRE.

REFERENCES CITED

The following references are of record in the file of this patent:

UNITED STATES PATENTS

| Number | Name | Date |
|---|---|---|
| 70,913 | Sterling | Nov. 12, 1867 |
| 440,721 | Provoost | Nov. 18, 1890 |
| 622,206 | Claflin | Apr. 4, 1899 |
| 914,478 | Bradley et al. | Mar. 9, 1909 |
| 1,467,235 | Dekoff | Sept. 4, 1923 |
| 1,721,338 | Gagnon | July 16, 1929 |

FOREIGN PATENTS

| Number | Country | Date |
|---|---|---|
| 77,882 | Sweden | July 25, 1933 |